United States Patent [19]

Ohta et al.

[11] Patent Number: 5,265,074
[45] Date of Patent: Nov. 23, 1993

[54] MAGNETO-OPTICAL RECORDING MEDIUM

[75] Inventors: Masumi Ohta; Isamu Nakao, both of Tokyo; Katsuhisa Aratani, Chiba, all of Japan

[73] Assignee: Sony Corporation, Tokyo, Japan

[21] Appl. No.: 832,579

[22] Filed: Feb. 7, 1992

[30] Foreign Application Priority Data

Feb. 8, 1991 [JP] Japan .................. 3-018077

[51] Int. Cl.⁵ .................. G11B 11/10; G11B 5/02
[52] U.S. Cl. .................. 369/13; 360/59; 360/114
[58] Field of Search .................. 369/13; 360/59, 114, 360/66, 131; 428/694, 900, 697; 365/122; 427/131

[56] References Cited

U.S. PATENT DOCUMENTS

| | | | |
|---|---|---|---|
| 4,995,024 | 2/1991 | Arimune et al. | 369/13 |
| 5,018,119 | 5/1991 | Aratani et al. | 369/13 |
| 5,132,945 | 7/1992 | Osato et al. | 369/13 |
| 5,143,798 | 9/1992 | Fujii | 428/694 |
| 5,168,482 | 12/1992 | Aratani et al. | 369/13 |

FOREIGN PATENT DOCUMENTS

415449A2 3/1991 European Pat. Off.
2-96926 4/1990 Japan.

*Primary Examiner*—Robert J. Pascal
*Assistant Examiner*—Ali Neyzari
*Attorney, Agent, or Firm*—Hill, Steadman & Simpson

[57] ABSTRACT

A magneto-optic recording and reproducing medium is formed of a reproduction layer composed mainly of GdFeCo and having a saturation magnetization of at least 450 emu/cc and a coercive force of not more than 4 kOe, and a recording layer composed mainly of TbFeCo, having a coercive force of at least 5 kOe, and having a magnetization of not more than 300 emu/cc when it is a transition metal-predominant film and not more than 200 emu/cc when it is a rare earth-predominant film.

8 Claims, 11 Drawing Sheets

LV = 8 m/s f = 10 MHz

LV = 8 m/s
f = 10 MHz
Pr = 3.0 mW

MAGNETO-OPTICAL RECORDING MEDIUM

BACKGROUND OF THE INVENTION

The present invention relates to a magneto-optical recording medium, and particularly a magneto-optical recording medium of high resolution.

In a magneto-optical recording and reproduction method, local heating by irradiation with laser light is carried out to form information record pits, or bubble domains, and the recorded information is read through a magneto-optical interaction, i.e. the Kerr effect or the Faraday effect. When this method is adopted, increasing the density of magneto-optical recording may be accomplished by reducing the size of the record pits. In such a case, a problem arises as to the resolution (resolving power) in reproduction. The resolution is determined by the laser wavelength $\lambda$ and the numerical aperture N.A. of an objective lens which are used for reproduction.

Figure 1A:
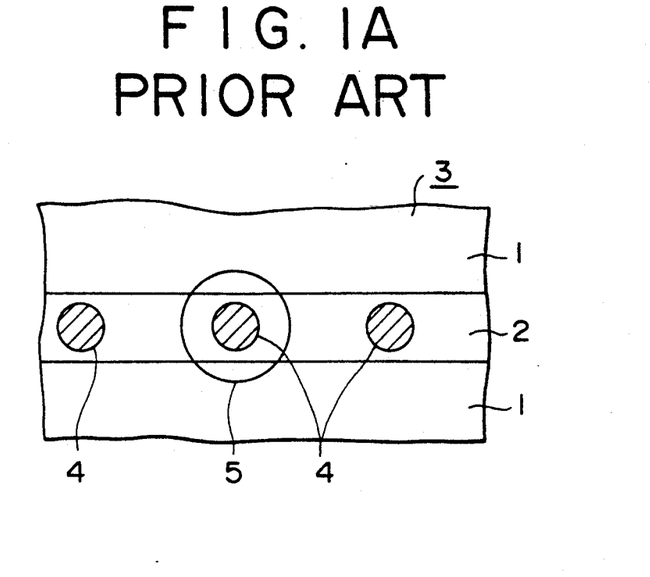
FIGS. 1A–1D is an illustration of a reproduction mode of magneto-optical recording according to the prior art.
Figure 1B:
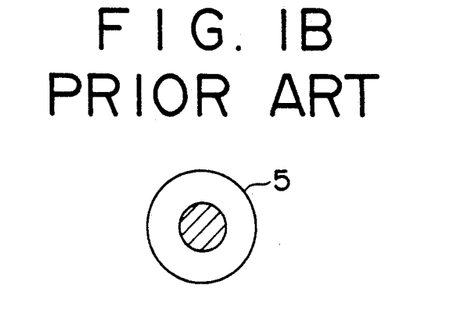
Figure 1C:
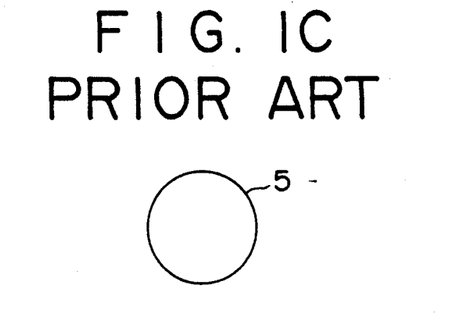
Figure 1D:
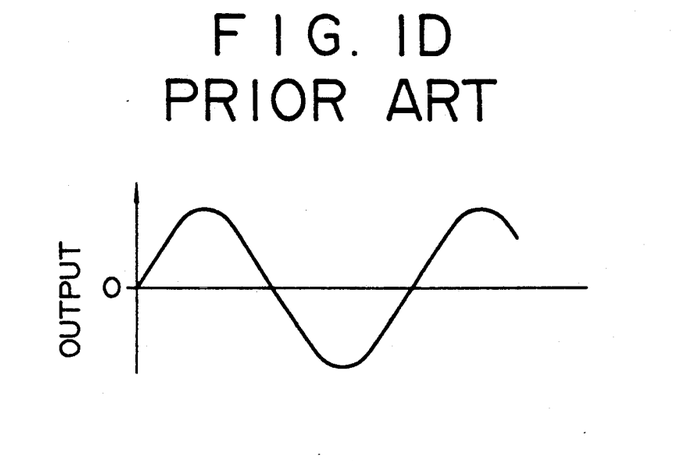

A conventional magneto-optical recording and reproduction system will now be explained with reference to FIG. 1. FIG. 1A shows a schematic top plan of a record pattern, in which a magneto-optical recording medium 3 such as a magneto-optical disk has record pits 4 (hatched areas) formed, for instance, according to two-valued information "0" and "1", in a land portion 2 bounded on both sides by grooves 1, for example. The method of reproduction in use of such a magneto-optical recording medium will be explained, with reference to the case where the beam spot of reading laser light incident on the magneto-optical recording medium 3 is a circular spot, as is denoted by reference sign 5. When the pit interval is so selected that only one record pit 4 can be present in a single beam spot 5, as shown in FIG. 1A, each area irradiated with the reading laser beam will exhibit either of two kinds of status. Namely, the irradiated area has either one record pit 4 or no record pit in the beam spot 5, as respectively shown in FIG. 1B or 1C. Where the record pits 4 are arranged at regular intervals, therefore, an output waveform obtained from the recording medium 3 may be one that is alternatingly positive and negative with respect to a reference level 0; for instance, the output waveform may be a sinusoidal one, as shown in FIG. 1D.

Figure 2A:
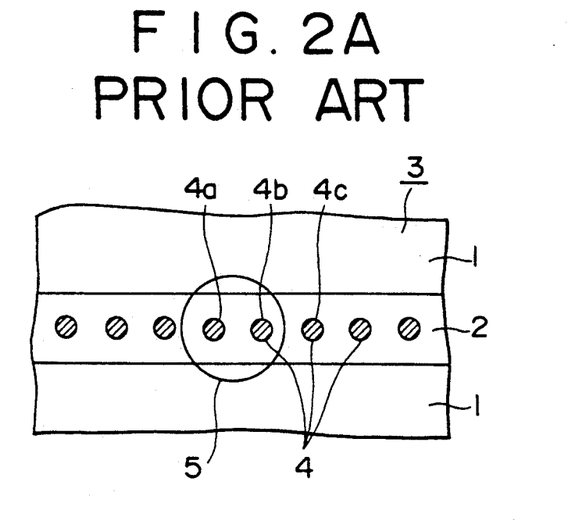
FIGS. 2A–2D is an illustration of a reproduction mode of magneto-optical recording according to the prior art.
Figure 2B:
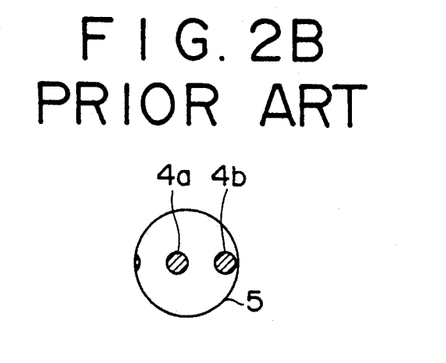
Figure 2C:
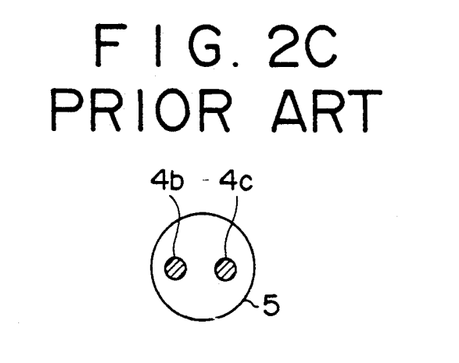
Figure 2D:
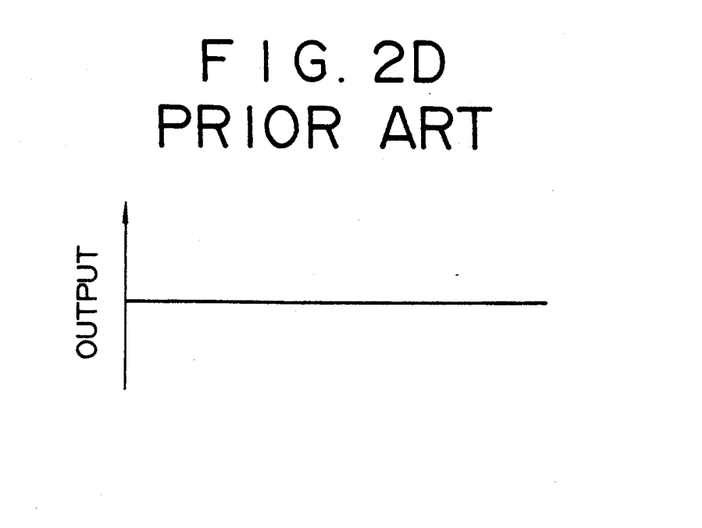

On the other hand, where the record pits 4 are arranged in high density as shown in a schematic top plan of a record pattern in FIG. 2A, a plurality of record pits 4 come under the beam spot 5 simultaneously. Referring to three successive record pits 4a, 4b and 4c, for instance, the reproduction output obtained when the adjacent record pits 4a and 4b are located in a single beam spot 5 does not differ from the reproduction output obtained when the record pits 4b and 4c are located in the beam spot 5, as shown in FIGS. 2B and 2C. Therefore, the reproduction output waveform will be, for example, rectilinear as shown in FIG. 2D, and the reproduction outputs in the above two situations cannot be distinguished from each other.

Thus, in the magneto-optical recording and reproduction system generally used in the prior art, the record pits 4 formed on the magneto-optical recording medium 3 are kept as they are during reading of recorded information. Therefore, even if high-density recording, i.e. formation of record pits in a high density, is accomplished, a high S/N (C/N) cannot be obtained due to limitations as to resolution in reproduction. In short, satisfactory high density recording and reproduction cannot be achieved according to the conventional magneto-optical recording and reproduction system.

In order to solve the S/N (C/N) problem, it is necessary to improve the resolution (resolving power) in reproduction, and there arises another problem that the laser wavelength $\lambda$, the numerical aperture N.A. of the objective lens, etc. impose restrictions on the resolving power. As a countermeasure against these problems, the present applicant has previously proposed a superhigh-resolution (superhigh resolving power) magneto-optical system for recording and reproduction (the system will be hereinafter referred to as "MSR") (Refer to, for example, Unexamined Japanese Patent Publication HEI 1-225685 entitled "Magneto-optical recording and reproduction process" and Unexamined Japanese Patent Publication HEI 1-229395 entitled "Signal reproduction process for magneto-optical recording media", incorporated herein).

An explanation will now be given of the MSR. In the MSR, a temperature distribution produced by relative movement of a magneto-optical recording medium and a reproducing beam spot 5 is utilized so as to ensure that record pits 4 on the magneto-optical recording medium will, in reproduction, be generated only in a predetermined temperature region, resulting in a higher resolution in reproduction.

Examples of the MSR system include so-called relief type and extinction type reproduction systems.

Figure 3A:
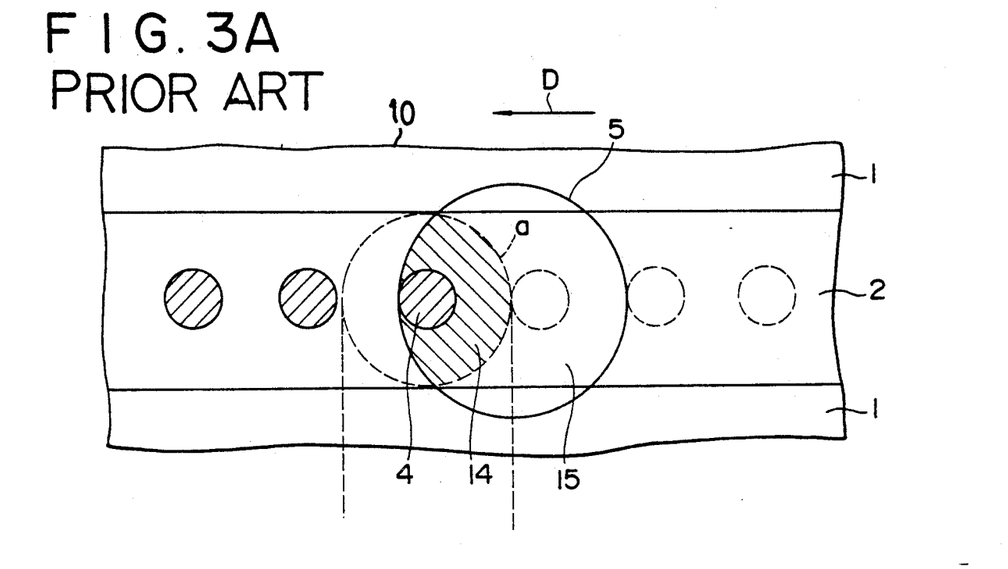
FIGS. 3A–3B is an illustration of one relief type MSR.
Figure 3B:
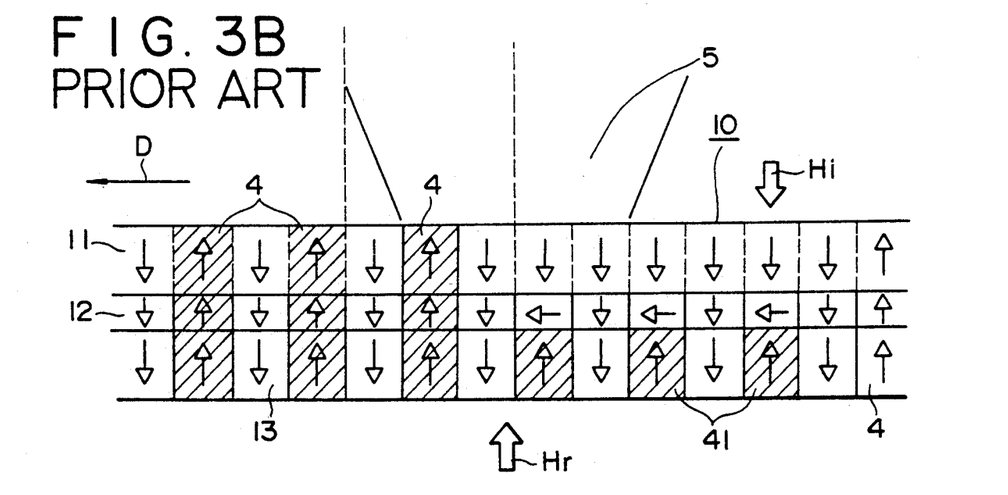

First, the relief type MSR system will be explained with reference to FIG. 3. FIG. 3A is a schematic top plan showing a record pattern on a magneto-optical recording medium 10, and FIG. 3B is a schematic sectional view showing a magnetization mode of the same. As shown in FIG. 3A, the magneto-optical recording medium 10 is moved in the direction of arrow D, relative to a laser beam spot 5. As shown in FIG. 3B by way of example, the magneto-optical recording medium 10 such as a magneto-optical disk used here comprises at least a reproduction layer 11 composed of a perpendicular magnetization film and a recording layer 13; preferably, the recording medium 10 further comprises an intermediate layer 12 interposed between the layers 11 and 13. Arrows in the layers 11, 12 and 13 each represent schematically the orientation of a magnetic moment. In the example shown, the downward orientation corresponds to an initialized state. Information record pits 4 in the form of magnetic domains are formed at least in the recording layer 13 by upward magnetization, as viewed in the figure.

In a reproduction mode of the magneto-optical recording medium 10, first an initializing magnetic field Hi is applied externally, whereby the reproduction layer 11 is initialized by being magnetized in a downward orientation as seen in FIG. 3B. Namely, the record pits 4 in the reproduction layer 11 disappear. In this case, in the areas where the record pits 4 are present, the magnetization directions of the reproduction layer 11 and the recording layer 13 are kept opposite to each other by a domain wall produced at the intermediate layer 12, so that the record pits 4 are left as latent record pits 41.

On the other hand, a reproducing magnetic field Hr in the opposite direction to the initializing field Hi is applied to the magneto-optical recording medium 10, at least in a reproduction area thereof. As the medium 10 in this condition is moved, the region including the latent record pits 41 initialized as above comes to fall under the beam spot 5. Then, when the portion heated by irradiation with the laser beam is moved to the front end side of the beam spot 5, i.e. leftward in FIG. 1, a substantially high-temperature region 14 encircled with broken line (a) and hatched in the figure is generated on the front end side of the spot 5. In the region 14, the domain wall at the intermediate layer 12 is lost, and the magnetization of the recording layer 13 is transferred to the reproduction layer 11 by exchange force. As a result, the latent record pits 41 present in the recording layer 13 are duplicated in relief in the reproduction layer 11, as reproducible record pits 4.

Therefore, the record pits 4 can be read by detecting the rotation of the polarization plane caused at the beam spot 5 by the Kerr effect or the Faraday effect, according to the magnetization direction of the reproduction layer 11. Furthermore, in a low-temperature region 15 other than the high-temperature region 14 in the beam spot 5, the latent record pit 41 is not duplicated in relief in the reproduction layer 11. In the beam spot 5, consequently, the readable record pit 4 is present only in the hatched, narrow, high-temperature region 14. As a result, even in the case of such a recording density that a plurality of record pits 4 come under the beam spot 5 at the same time, namely, even in a magneto-optical recording medium 10 for high-density recording, it is possible to read only a single record pit 4, and hence to achieve high-resolution reproduction.

In order to perform such reproduction, the initializing magnetic field Hi, reproducing magnetic field Hr as well as the coercive force, thickness, magnetization and domain wall energy of each magnetic layer, etc. are selected according to the temperatures of the high-temperature region 14 and low-temperature region 15 in the beam spot 5. Namely, where the reproduction layer 11 and the recording layer 13 have coercive forces $H_{C1}$ and $H_{C3}$, thicknesses $h_1$ and $h_3$, and saturation magnetization ($M_S$) values $M_{S1}$ and $M_{S3}$, respectively, the condition for initializing the reproduction layer 11 only is given by the following Equation 1:

$$Hi > H_{C1} + \sigma_{w2}/2M_{S1}h_1 \qquad \text{(Equation 1)}$$

where $\sigma_{w2}$ is the interfacial domain wall energy between the reproduction layer 11 and the recording layer 13.

Also, the condition for the information recorded in the recording layer 13 to be maintained under the magnetic field is given by Equation 2:

$$Hi < H_{c3} = \sigma_{w2}/2M_{s3}h_3 \qquad \text{(Equation 2)}$$

Further, in order that the domain wall at the intermediate layer 12 between the reproduction layer 11 and the recording layer 13 may be maintained after passage under the initializing magnetic field Hi, the condition expressed by the following Equation 3 is required.

$$H_{c1} > \sigma_{w2}2M_{s1}h_1 \qquad \text{(Equation 3)}$$

As for the temperature $T_H$ selected to be in the high-temperature region 14, the condition expressed by the following Equation 4 should be satisfied.

$$H_{c1} - \sigma_{w2}/2M_{s1}h_1 < H_r < H_{c1} + \sigma_{w2}/2M_{s1}h_1 \qquad \text{(Equation 4)}$$

By application of a reproducing magnetic field Hr which fulfills the condition of Equation 4, the magnetization of the latent record pits 4 in the recording layer 13 can be transferred to the reproduction layer 11, that is it is duplicated in relief as record pits 41 in the reproduction layer 11, and only in the area where the domain wall formed by the intermediate layer 12 is present.

Figure 4:
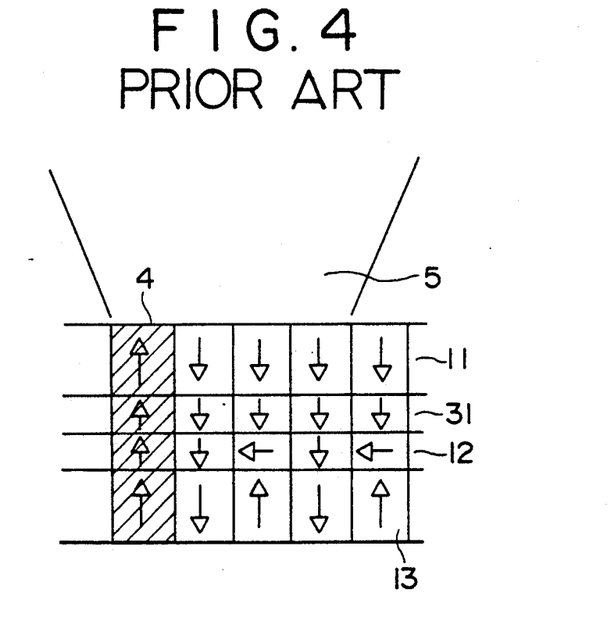
FIG. 4 is an illustration of another relief type MSR.

Although the magnetic recording medium 10 used for the MSR system above has been explained with reference to a three-layer structure comprising the reproduction layer 11, intermediate layer 12 and recording layer 13, a four-layer structure may also be adopted in which a reproduction sub-layer 31 is provided on the side of the intermediate layer 12 with respect to the reproduction layer 11, as illustrated by a schematic sectional view thereof in FIG. 4.

The reproduction sub-layer 31 functions in aid of the characteristics of the reproduction layer 11, and compensates for the coercive force of the reproduction layer 11 at room temperature. The presence of the reproduction sub-layer 31 ensures that the magnetization of the reproduction layer 11 aligned by the initializing magnetic field Hi can exist in stable fashion in the presence of the domain wall, and the coercive force of the reproduction layer 11 is reduced drastically in the vicinity of the reproduction temperature. Thus, the domain wall is confined in the intermediate layer 12 and is permitted to spread into the reproduction sub-layer 31 to finally reverse the magnetization of the reproduction layer 11. This is accompanied by disappearance of the domain wall. As a result, the record pits in the recording layer 13 can be duplicated in relief in the reproduction layer 11 in an improved manner.

When the four-layer structure including the reproduction sub-layer 31 is adopted, the coercive force $H_{c1}$ of the reproduction layer 11 is replaced by $H_{CA}$ defined by the following Equation 5, and $\sigma_{w2}/M_{S1}h_1$ by $\sigma_{w2}/(M_{s1}h_1 + M_{s1s}h_{1s})$.

$$H_{CA} = (M_{s1}h_1H_{c1} + M_{s1s}h_{1s}H_{c1s})/(M_{s1}h_1 + M_{s1s}h_{1s}) \qquad \text{(Equation 5)}$$

(in the foregoing relief type MSR, $H_{c1} < H_{CA} < H_{c1s}$) where $M_{s1s}$, $M_{c1s}$ and $h_{1s}$ respectively represent the magnetization, coercive force and thickness of the reproduction sub-layer 31.

Figure 5A:
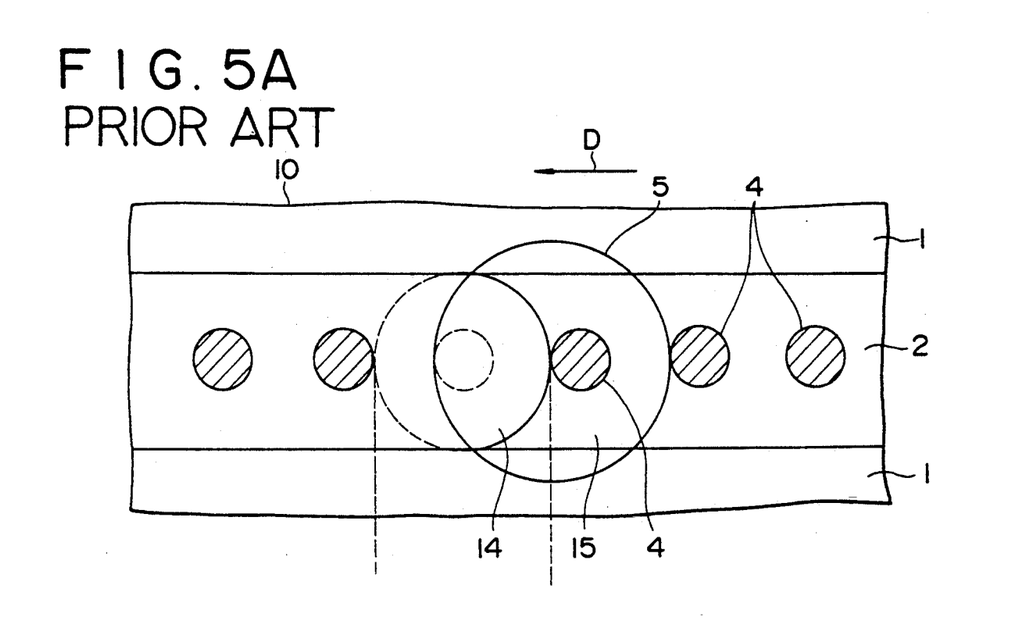
FIGS. 5A–5B is an illustration of one extinction type MSR.
Figure 5B:
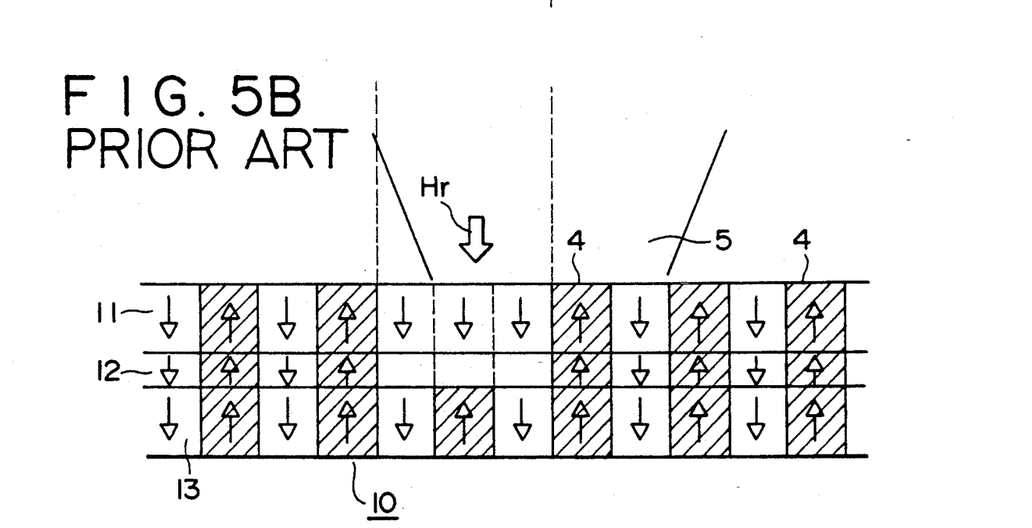

In the next place, the extinction type MSR will be explained with reference to FIG. 5. FIG. 5A is a schematic top plan showing a record pattern on a magneto-optical recording medium 10, and FIG. 5B is a schematic sectional view showing a magnetization mode thereof. In FIGS. 5A and 5B, component parts corresponding to those in FIGS. 3A and 3B are denoted by the same reference signs as used in FIGS. 3A and 3B, and the explanation of those parts will not be repeated. This MSR system does not require an initializing magnetic field Hi.

In a reproduction mode of the magneto-optical recording medium 10, the condition expressed by the following Equation 6 is fulfilled in a high-temperature region 14. Thus, the magnetization in the high-temperature region 14, even if in a laser beam spot 5, is aligned in the downward direction by a reproducing magnetic field Hr applied externally. Consequently, record pits 4 in a reproduction layer 11 disappear. Thus, the extinction type MSR system is designed so that reproduction can be performed only for the record pits 4 present in a low-temperature region 15 located in the beam spot 5, thereby offering an improved resolution.

$$Hr > H_{c1} + \sigma_{w2}/2M_{s1}h_1 \qquad \text{(Equation 6)}$$

In this case, however, conditions such as the coercive force of a recording layer 13 are set so that even after the extinction (disappearance) of the record pits 4 in the reproduction layer 11, the record pits 4 in the recording layer 13 are left as latent record pits 41. It is thereby ensured that, at room temperature, the magnetization of the recording layer 13, namely, the information pits 4 in the layer 13 are transferred to the reproduction layer 11 and held in the reproducible state.

According to the relief type and extinction type MSR systems described above, the record pits located in a part of the area of the reproducing laser beam spot are reproduced, so as to attain an enhanced resolution in reproduction.

Figure 6:
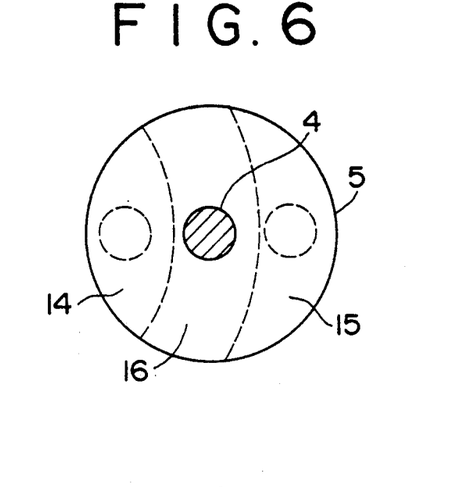
FIG. 6 is an illustration of another extinction type MSR.

Furthermore, the above relief type and extinction type MSR systems may be used in combination. In that case, a magneto-optical recording medium 10 located under a beam spot 5 is provided with a temperature distribution in which temperature becomes lower from the forward side toward the backward side with respect to the moving direction of the recording medium relative to the beam spot 5, resulting in the formation of a high-temperature region 14, an intermediate-temperature region 16 and a low-temperature region 15 in the area of the beam spot 5, as shown in FIG. 6. The high-temperature region 14 is made to have the function of the extinction type as explained above with reference to FIG. 5, while the intermediate-temperature region 16 and the low temperature region 15 are made to function respectively as the high-temperature region 14 and low-temperature region 15 as explained above with reference to FIG. 1.

According to the MSR system employing both the relief type and the extinction type in combination, the record pit 4 to be developed in relief in the reproduction layer 11, represented by hatching in FIG. 6, can be present only in the limited, intermediate-temperature region 16 defined between the high-temperature region 14 and the low-temperature region 15. A higher resolution can be thereby achieved.

It is thus possible, according to the MSR systems, to achieve superhigh-resolution reproduction without any restrictions imposed by the wavelength λ of the laser beam or the numerical aperture N.A. of the objective lens.

Accordingly, the MSR systems enable a wavelength selection for the reading light to be made taking into account the magneto-optical effect, the temperature rise due to light absorption, the sensitivity of a light detector and the like, without adhering to the use of a shorter wavelength.

In other words, a semiconductor laser light with a comparatively long wavelength (780 nm), for example, can be used as the reading light, to obtain a high reproduction resolution.

SUMMARY OF THE INVENTION

It is accordingly an object of this invention to provide a magneto-optical recording medium with which reproduction based on the foregoing relief type MSR system or the combined relief-extinction type MSR system, especially reproduction with a pit length of 0.4 μm and a high C/N of at least about 40 dB, can be performed securely and in stable fashion.

It is an object of the invention to assure reproduction with a high resolution.

According to the invention, a reproduction layer 11 is composed mainly of GdFeCo and has a saturation magnetization of at least 450 emu/cc and a coercive force of not more than 4 kOe. A recording layer is composed mainly of TbFeCo, and has a coercive force of at least 5 kOe. The recording layer has a magnetization of not more than 300 emu/cc if it is a transition metal-predominant film, and has a magnetization of not more than 200 emu/cc when it is a rare earth-predominant film.

DESCRIPTION OF THE PREFERRED EMBODIMENTS

Figure 7:
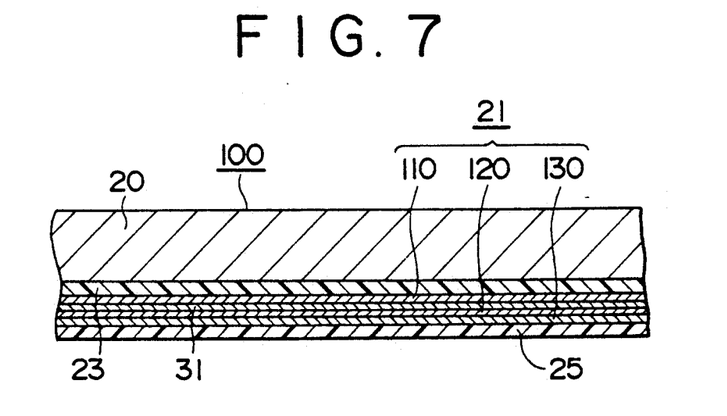
FIG. 7 is a schematic sectional view of one embodiment of the magneto-optical recording medium according to this invention.

Referring now to FIG. 7, there is schematically shown, in section, a magneto-optical recording medium 100, which comprises at least a reproduction layer 110, a recording layer 130 and an intermediate layer 120 interposed therebetween, the layers being so stacked that the adjacent ones thereof are magnetically coupled, and from which recorded signals are read through changing the state of magnetization of the reproduction layer under irradiation with reading light. It is assumed that the reproduction layer 110 and the recording layer 130 have saturation magnetization ($M_s$) values of $M_{s1}$ and $M_{s3}$, and coercive force ($H_c$) values of $H_{c1}$ and $H_{c3}$, respectively.

According to this invention, in the just-mentioned magneto-optical recording medium, the reproduction layer 110 comprises a rare earth-transition metal magnetic layer containing GdFeCo as a main constituent, and satisfies $M_{s1} \leq 450$ emu/cc and $H_{c1} \leq 4$ kOe at room temperature.

The recording layer 13 comprises a rare earth-transition metal magnetic layer containing TbFeCo as a main constituent, satisfies $H_{c3} \geq 5$ kOe, and also satisfies either $M_{s3} \leq 300$ emu/cc or $M_{s3} \leq 200$ emu/cc, depending on whether the recording layer is a TM (transition metal) rich film or an RE (rare earth) rich film.

Recording of information, or formation of record pits 4, on the magneto-optical recording medium 100 according to this invention is carried out at least in the recording layer 130. The information recording can be made, for example, by the magnetic field modulation system.

Figure 8:
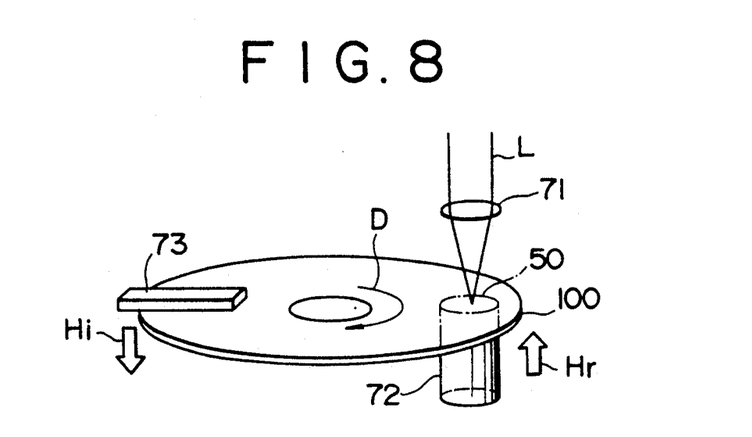
FIG. 8 is a perspective view illustrating a reproduction mode of one embodiment of the magneto-optical recording medium according to this invention.

Reading of information from the magneto-optical recording medium 100, for example a magneto-optical disk, having information thus recorded as record pits 4 in the recording layer 130 is carried out in the manner as shown in FIG. 8, in which a linearly polarized laser beam L of semiconductor laser light (wavelength 780 nm) is focused by an objective lens 71 on the medium 100 revolving in the direction of arrow D, from the side of a substrate 20 as explained with reference to FIG. 1.

The record pit 4 is read by detecting the difference between the rotation of the polarization plane in the pit area, especially at the reproduction layer 110, by the Kerr effect and the corresponding rotation in the other (non-pit) areas.

A reproducing field generating means 72 is provided by which a reproducing magnetic field Hr, developed by a required DC magnetic field orthogonal to the plane of the medium 100, is applied to the area including the part of the medium 100 irradiated with the beam spot 50 of the laser beam L.

On the other hand, an initializing field generating means 73 is provided by which a DC initializing magnetic field Hi, directed opposite to the reproducing magnetic field Hr, is applied to a part of the medium 100 not yet brought under the beam spot 50. With these arrangements, reproduction is carried out according to the relief type MSR system as explained with reference to FIGS. 3 and 4, or according to a combination of the relief type and extinction type as explained with reference to FIG. 6; namely, the reproduction is carried out by a reading system which at least comprises developing (or duplicating) the record pits 4 in relief into the recording layer 110.

An application of this invention to a magneto-optical disk will now be explained.

As shown in FIG. 7, the magneto-optical disk may be fabricated by sequentially providing, as for instance by sputtering, a dielectric film 23 composed of SiN or the like with an exemplary thickness of 800 Å, a magneto-optical recording layer 21, and a protective film 25 composed of SiN or the like with an exemplary thickness of 800 Å on a light-transmitting substrate 20 formed of a glass, a polycarbonate resin, or the like.

The magneto-optical recording layer 21 may have a three-layer structure which, as explained with reference to FIG. 3, comprises a reproduction layer 11, an intermediate layer 12 and a recording layer 13 in successive magnetic coupling. However, a four-layer structure which, as explained with reference to FIG. 4, comprises a reproduction layer 11, a reproduction sub-layer 31, an intermediate layer 12 and a recording layer 13 with successive magnetic couplings may also be adopted. This produces an advantageous effect in, for example, compensating for the coercive force of the reproduction layer 11 at room temperature.

With reference to FIG. 7, the reproduction layer 110, reproduction sub-layer 31, intermediate layer 120 and recording layer 130 constituting the magneto-optical recording layer 21 can be formed by successive sputtering.

The reproduction layer 110 comprises, for example, GdFeCo as a main constituent, to which Cr of the like may be added, as required, for enhancing reliability, and Nd or the like for adaptation to a shorter wavelength laser light. The thickness $H_1$ of the reproduction layer 110 is so selected that the layer 110 is thick enough to obtain a sufficient Kerr effect in reproduction, and that the required temperature distribution can be obtained without needing an excessively high reproduction power. Namely, the thickness $h_1$ is selected in the range of 150 to 1000 Å. The Curie temperature $T_{c1}$ of the reproduction layer 110 is so selected that the Kerr rotation angle $\theta_K$ is not deteriorated due to the temperature rise caused by the irradiation with laser light for reproduction. Namely, the Curie temperature $T_{c1}$ is selected, on a functional basis, to be about 200° C. or above. The saturation magnetization $M_{s1}$ of the reproduction layer 110 is in the range of $0 < M_{s1} \leq 450$ emu/cc (at room temperature) in the case of TM-rich film compositions, and in the range of $0 < M_{s1} \leq 350$ emu/cc in the case of RE-rich film compositions.

The reproduction sub-layer 31 is composed of a magnetic layer whose main constituent is TbFeCo, for example, and which has a saturation magnetization $M_{s1s}$ of 100 to 600 emu/cc in the case of TM-rich film compositions (at room temperature). The coercive force $H_{c1s}$ of the reproduction sub-layer 31 is preferably 7 kOe or below, provided that $H_{CA}$ defined by the above Equation 5 is not more than 4 kOe. The Curie temperature $T_{c1s}$ of the layer 31 is about 60° to 100° C. The reproduction sub-layer 31 is constituted mainly of a TbFeCo-based material, to which traces of Gd, Cr, Nd, Dy or Al may be added so as to control the characteristics of the layer, especially the temperature characteristic of the coercive force $H_{c1s}$.

The intermediate layer 120 is composed of a magnetic layer consisting mainly of GdFeCo, for example. The saturation magnetization $M_{s2}$ of the layer 120 is in the range of $0 < M_{s2} \leq 700$ emu/cc in the case of TM-rich film compositions, and in the range of $0 < M_{s2} \leq 200$ emu/cc in the case of RE-rich film compositions. Compensation temperature of the intermediate layer 120 may be 100° C. or below, and a film thickness $h_2$ of not less than about 50 Å may be sufficient.

The recording layer 130 is composed of a magnetic layer of which the main constituent is TbFeCo, for example, and the saturation magnetization $M_{s3}$ is in the range of $0 < M_{s3} \leq 300$ emu/cc in the case of TM-rich film compositions and $0 < M_{s3} 200$ emu/cc in the case of RE-rich film compositions. For the recording layer 130 also, a thickness $h_3$ of not less than about 200 Å may be sufficient.

The saturation magnetization herein is represented by the value at room temperature.

In use of the magneto-optical recording medium 100, namely, with the magneto-optical disk having the construction as above, reading of record pits through the Kerr effect from the reproduction layer 110 is carried out by a magneto-optical reproduction drive system as described with reference to FIG. 8, according to the principle explained with reference to FIGS. 3, 4 and 6.

Embodiment 1

In the construction as described above with reference to FIG. 7, the dielectric film 23 was composed of an SiN film with 800 Å thickness, and the reproduction layer 110 was composed of GdFeCo ($M_{s1}=225$ emu/cc) in a thickness $h_1$ of 350 Å. The reproduction sub-layer 31 was composed of TbFeCo ($M_{s1s}=320$ emu/cc) in a thickness $h_{1s}$ of 200 Å, with $H_{CA}=3$ kOe. The intermediate layer 120 was composed of GdFeCo ($M_{s2}=200$ emu/cc) in a thickness $h_2$ of 150 Å, with $H_{c2}=800$ (Oe). The recording layer 130 was composed of TbFeCo ($M_{s3}=50$ emu/cc in a thickness $h_3$ of 400 Å, with a coercive force $H_{c3}>15$ kOe. In this manner, a 5.25-inch magneto-optical disk was produced.

Figure 9:
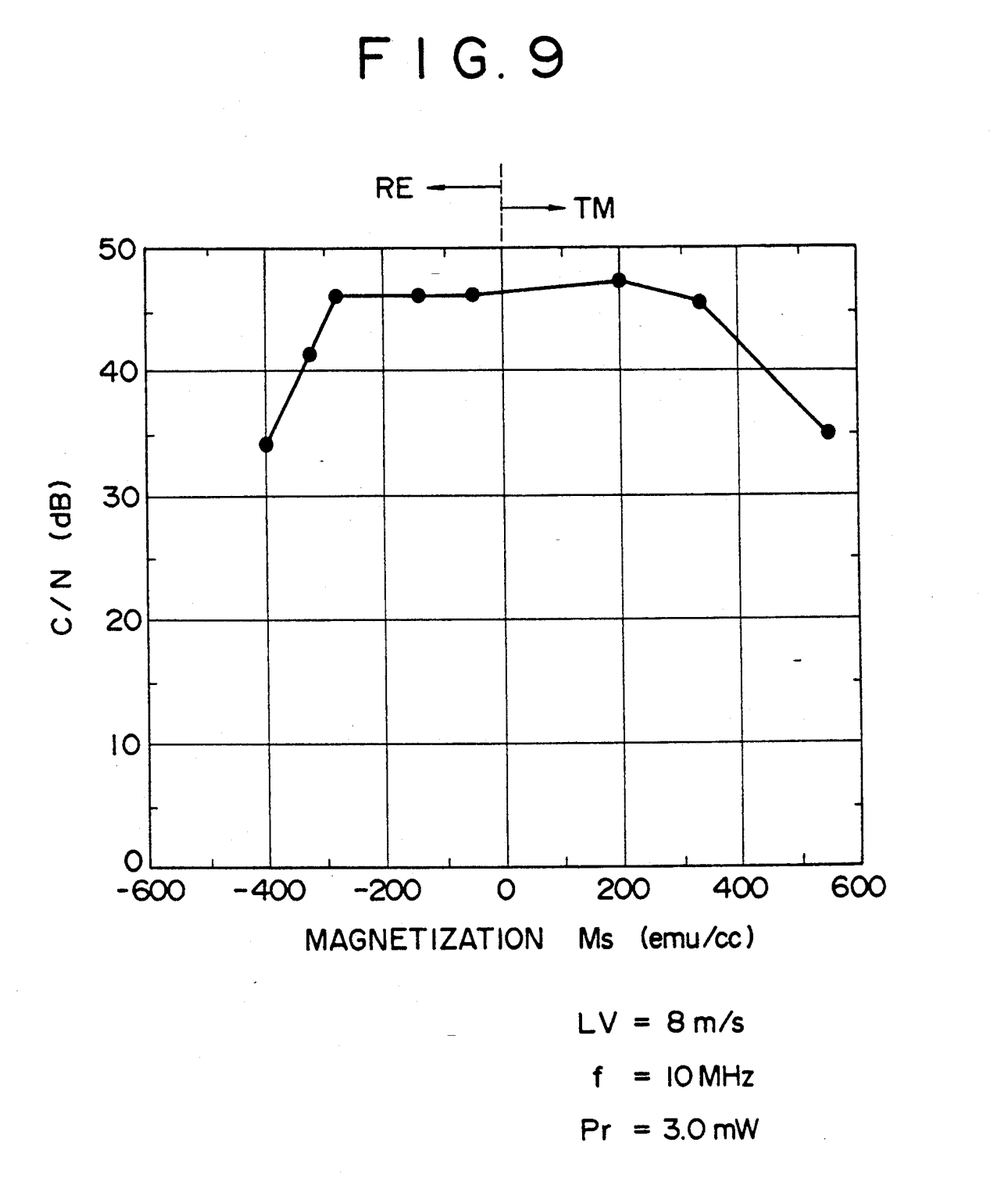
FIG. 9 is a graph showing the relationship between a magnetization of the reproduction layer and C/N for the magneto-optical recording medium according to this invention.

The magneto-optical disk thus obtained in Embodiment 1 was subjected to measurement of C/N versus magnetization $M_s$ of the reproduction layer 110 at room temperature, under the conditions of a revolving speed of 2400 rpm, a linear velocity VL at radius r=30 mm of 8 m/sec, a signal frequency f=10 MHz, namely a 0.8 μm pitch (pit length 0.4 μm), and a reading laser power Pr=3.0 mW, with the composition of the reproduction layer 110 being varied. The results are shown in FIG. 9. It is seen from the figure that C/N of 40 dB or above can be obtained at a magnetization of $0<M_{s1}\leq 450$ emu/cc with TM-rich film compositions, and $0<M_{s1}\leq 350$ emu/cc with RE-rich film compositions.

Figure 10:
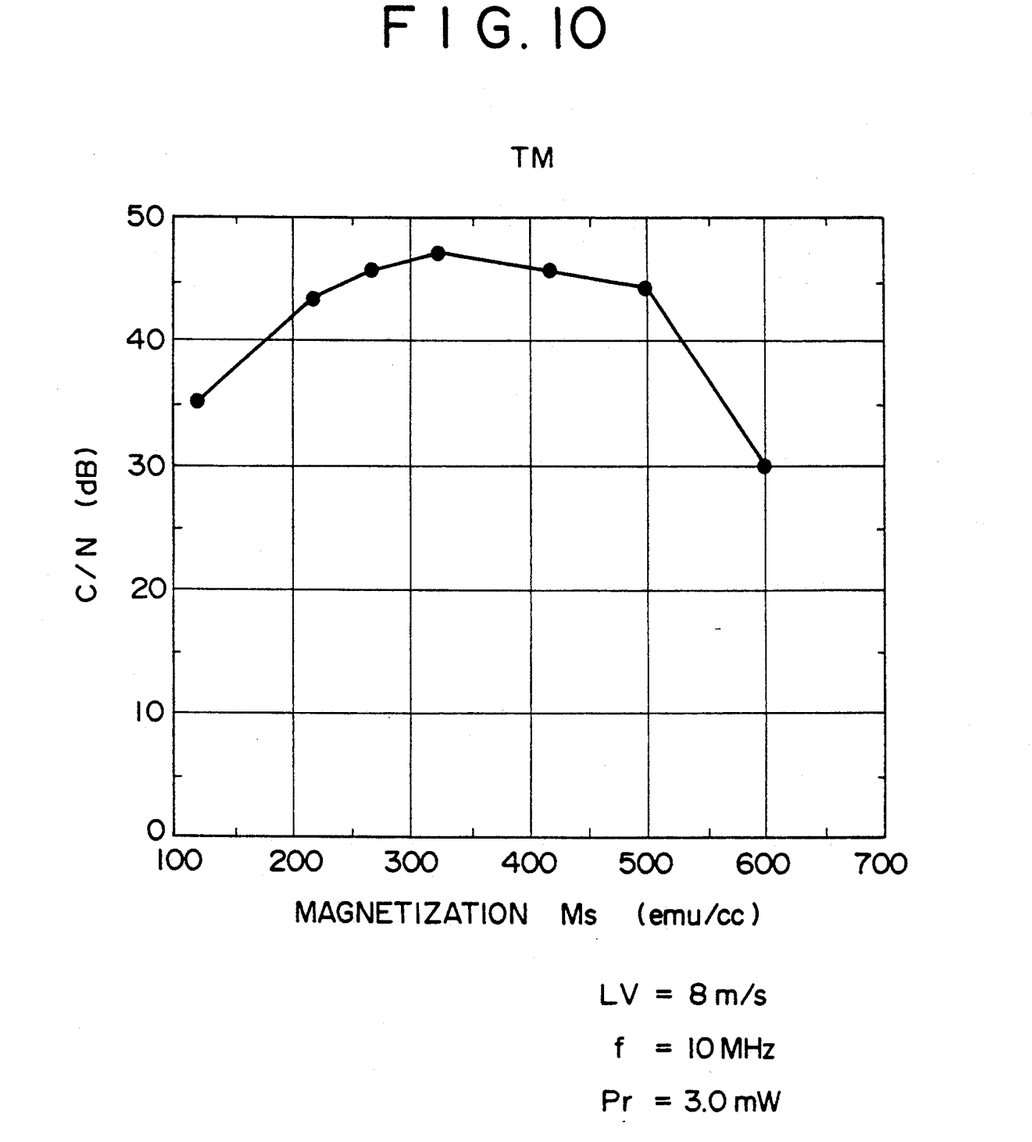
FIG. 10 is a graph showing the relationship between magnetization of a reproduction sub-layer and C/N for the magneto-optical recording medium according to this invention.
Figure 11:
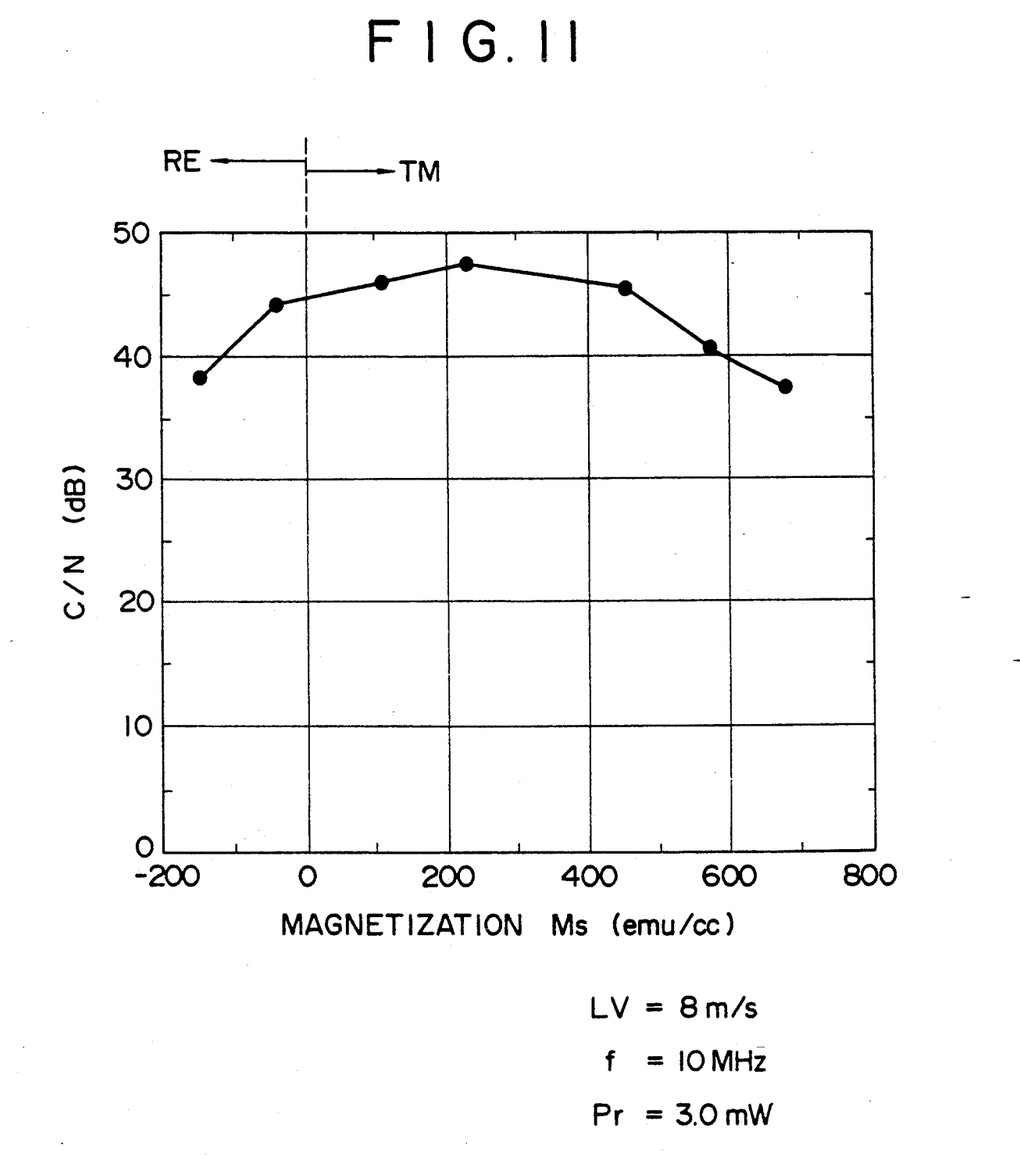
FIG. 11 is a graph showing the relationship between magnetization of the intermediate layer and C/N for the magneto-optical recording medium according to this invention.
Figure 12:
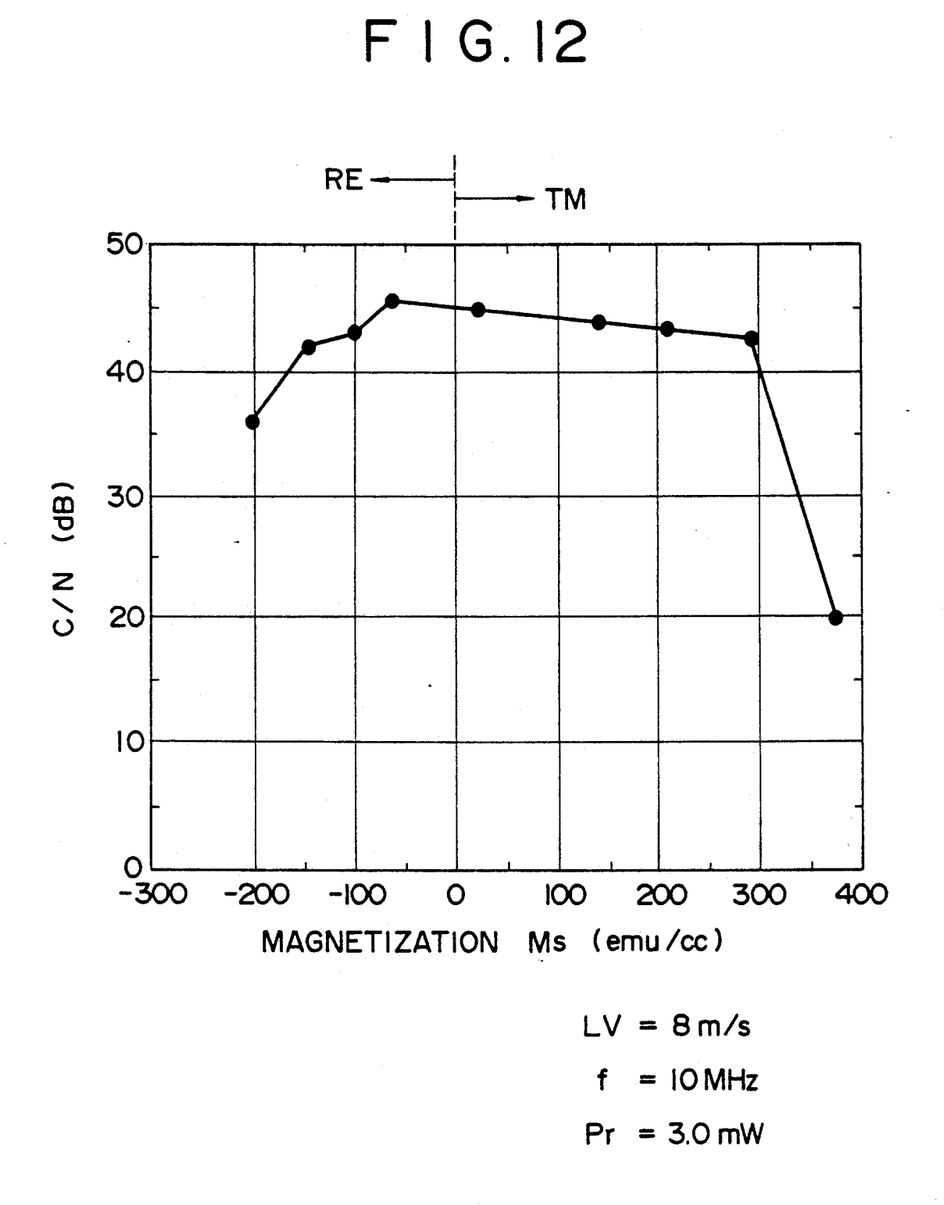
FIG. 12 is a graph showing the relationship between magnetization of the recording layer and C/N for the magneto-optical recording medium according to this invention.

In FIG. 9 and in FIGS. 10 to 12, which will be referred to below, the magnetization is expressed in negative values for the RE-rich film compositions and in positive values for the TM-rich film compositions.

Next, the magneto-optical disk obtained in Embodiment 1 was subjected to another series of measurements of C/N under the same conditions as above, with the composition of the reproduction sub-layer 31 being varied. Namely, measurement of C/N versus magnetization $M_{s1s}$ of the layer 31 was carried out at room temperature by varying the Tb content of TbFeCo, to give the results as shown in FIG. 10. The results show that a C/N of 40 dB or above can be obtained at a magnetization of 100 to 600 emu/cc with TM-rich film compositions.

In addition, the conditions of $H_{c1s}<7$ kOe and $H_{CA}<$Hi (up to 4 kOe) are fulfilled.

Also, the magneto-optical disk obtained in Embodiment 1 was subjected to a measurement of C/N under the same conditions as above, with the composition of the intermediate layer 130 being varied. Namely, measurement of C/N versus magnetization $M_{s2}$ of the layer 130 was carried out at room temperature by varying the Gd content of GdFeCo, to give the results as shown in FIG. 11. The results show that a C/N of 40 dB or above can be obtained at $M_{s2}<700$ emu/cc with TM-rich film compositions, and at $M_{s2}\leq 200$ emu/cc with RE-rich film compositions.

Furthermore, the magneto-optical disk obtained according to Embodiment 1 was subjected to a measurement of C/N under the same conditions as above, with the composition of the recording layer 130 being varied. Namely, a measurement of C/N versus $M_{s3}$ was carried out at room temperature by varying the Tb content of TbFeCo to give the results as shown in FIG. 12. The results show that a C/N of 40 dB or above can be obtained at a magnetization of $0<M_{s1}\leq 450$ emu/cc with TM-rich film compositions, and at a magnetization of $0<M_{s1}\leq 350$ emu/cc with RE-rich film compositions.

Incidentally, the above GdFeCo, TbFeCo and the like are ferromagnetic materials, in which the sublattice magnetization of rare earth metals such as TbGd, etc. and the sublattice magnetization of transition metals such as FeCo, etc. are always opposite to each other. The saturation magnetization $M_s$ is the balance of the two kinds of sublattice magnetization.

In this case, the saturation magnetization $M_s$ decreases with increasing addition of rare earth (RE) to transition metal (TM), and becomes 0 (zero) at a certain addition amount at which the sublattice magnetizations of the TM and the RE are equal.

With further addition of RE, the sublattice magnetization of the RE becomes greater than that of the TM, and the saturation magnetization $M_s$ becomes larger.

Figure 13:
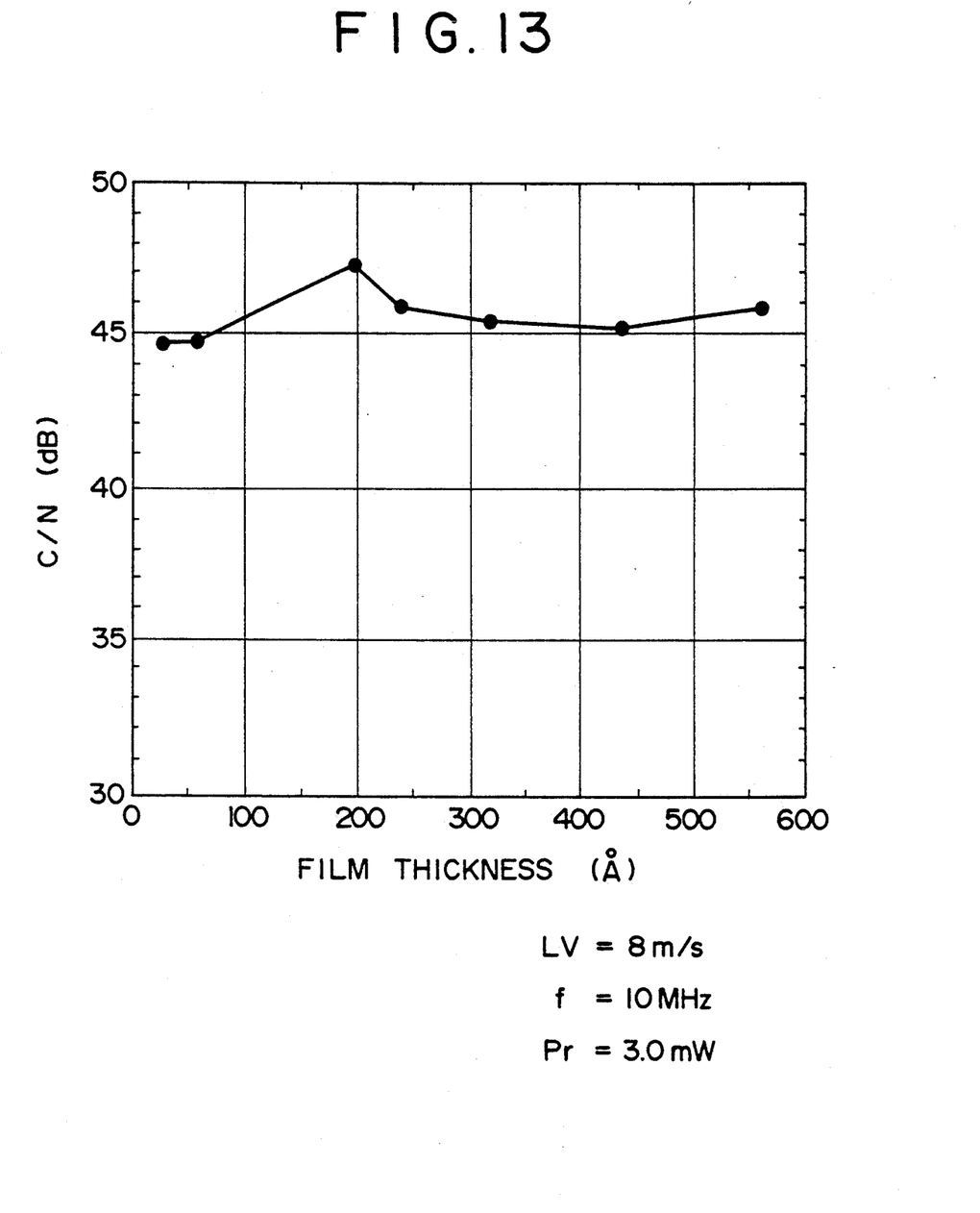
FIG. 13 is a graph showing the relationship between a thickness of the reproduction sub-layer and C/N for the magneto-optical recording medium according to this invention.

Measurement of C/N was also carried out by varying the thickness $h_{1s}$ of the reproduction sub-layer 31 in Embodiment 1. The results are shown in FIG. 13, from which it is seen that the film thickness $h_{1s}$ does not have significant influence on the characteristics of the recording medium.

As has been stated above, according to this invention it is possible to obtain a high C/N of at least 40 dB. This achievement is attributed to the assured functioning of the layers 110, 120, 130 and 31, by which latent record pits 41 in the recording layer 130 are transferred, or developed in relief, in a limited temperature area 14, as described with reference to FIGS. 3 and 4, upon irradiation with reproducing laser light.

Besides, the intermediate layer 120 and the sub-layer 31 are not limited to the rare earth-transition metal magnetic layers described above, but can be composed of other various rare earth-transition metal magnetic layers. The magneto-optical recording layer according to this invention is not limited to the magneto-optical recording layer 21 of the four-layer structure described in Embodiment 1, but may have a three-layer structure not comprising the reproduction sub-layer 31. Further, this invention is applicable to a variety of MSR systems based on the relief type and having, such as shown in the MSR system of FIG. 4, the reproduction layer 11, intermediate layer 12 and recording layer 13 as principal components of its structure.

As is clear from the above, the magneto-optical recording medium 100 according to this invention, when applied to the relief type MSR or to a combined relief-extinction type reproduction system using the relief type MSR as part of the principle thereof, ensures a high C/N of at least 40 dB in high-density recording at a recording frequency of 10 MHz. Therefore, this invention produces a very large profit in practice.

Although various minor changes and modifications might be proposed by those skilled in the art, it will be understood that we wish to include within the claims of the patent warranted hereon all such changes and modifications as reasonably come within our contribution to the art.

We claim as our invention:

1. A magneto-optical recording medium, comprising:
   at least a reproduction layer, a recording layer and an intermediate layer interposed between the reproduction and recording layers, and from which recorded signals are read through changing a state of magnetization of the reproduction layer;
   the reproduction layer and the recording layer having saturation magnetization values of $M_{s1}$ and $M_{s3}$, and coercive force values of $H_{c1}$ and $H_{c3}$, respectively;

the reproduction layer comprising a rare earth-transition metal magnetic layer containing GdFeCo as a main constituent, and which satisfies $M_{s1} \leq 450$ emu/cc and $H_{c1} \leq 4$ kOe; and the recording layer comprising a rare earth-transition metal magnetic layer containing TbFeCo as a main constituent, which satisfies $H_{c3} \geq 5$ kOe, and also which satisfies $M_{s3} \leq 300$ emu/cc when the recording layer is a transition metal-predominant film.

2. A medium according to claim 1 wherein a reproduction sublayer is provided between the recording layer and the intermediate layer.

3. A method for optical magnetic recording and reproducing, comprising the steps of:

providing an optical magnetic recording medium formed of a lamination of a reproducing magnetic layer and a recording magnetic layer which are magnetostatically coupled;

providing said reproducing magnetic layer as a rare earth-transition metal magnetic layer containing GdFeCo as a main constituent, and which satisfies $M_{s1} \leq 450$ emu/cc and $H_{c1} \leq 4$ kOe;

providing said recording magnetic layer as a rare earth-transition metal magnetic layer containing TbFeCo as a main constituent, which satisfies $H_{c3} \geq 5$ kOe, and which also satisfies $M_{s3} \leq 300$ emu/cc when said recording magnetic layer is a transition metal-predominant film, wherein said reproducing magnetic layer and said recording hold magnetic layer have saturation magnetization values of $M_{s1}$ and $M_{s3}$, and coercive force values of $H_{c1}$ and $H_{c3}$, respectively;

initializing said reproducing magnetic layer in an external magnetic field in one direction before reproduction;

transferring recorded magnetized information of said recording layer to said reproducing magnetic layer by a magneto-static field from the recorded magnetized information of said recording magnetic layer under a heated condition at the time of reproduction; and reading the magnetized information transferred onto said reproducing magnetic layer by light-magnetism interaction.

4. A magneto-optical recording medium, comprising:
at least a reproduction layer, a recording layer and an intermediate layer interposed between the recording layer and reproduction layer, and from which recorded signals are read through changing a state of magnetization of the reproduction layer;

the reproduction layer and the recording layer having saturation magnetization values of $M_{s1}$ and $M_{s3}$, and coercive force values of $H_{c1}$ and $H_{c3}$, respectively;

the reproduction layer comprises a rare earth-transition metal magnetic layer and satisfies $M_{s1} \leq 450$ emu/cc and $H_{c1} \leq 4$ kOe; and The recording layer comprises a rare earth-transition metal magnetic layer and satisfies $H_{c3} \geq 5$ kOe, and also satisfies $M_{s3} \leq 300$ emu/cc when the recording layer is a transition metal-predominant film.

5. A magneto-optical recording medium, comprising:
at least a reproduction layer, a recording layer and an intermediate layer interposed between the reproduction and recording layers, and from which recorded signals are read through changing a state of magnetization of the reproduction layer;

the reproduction layer and the recording layer having saturation magnetization values of $M_{s1}$ and $M_{s3}$, and coercive force values of $H_{c1}$ and $H_{c3}$, respectively;

the reproduction layer comprising a rare earth-transition metal magnetic layer containing GdFeCo as a main constituent, and which satisfies $M_{s1} \leq 450$ emu/cc and $H_{c1} \leq 4$ kOe; and the recording layer comprising a rare earth-transition metal magnetic layer containing TbFeCo as a main constituent, which satisfies $H_{c3} \geq 5$ kOe, and also which satisfies $M_{s3} \leq 200$ emu/cc when the recording layer is a rare earth predominant film.

6. A medium according to claim 5 wherein a reproduction sub-layer is provided between the recording layer and the intermediate layer.

7. A method for optical magnetic recording and reproducing, comprising the steps of:

providing an optical magnetic recording medium formed of a lamination of a reproducing magnetic layer and a recording magnetic layer which are magnetostatically coupled;

providing said reproducing magnetic layer as a rare earth-transition metal magnetic layer containing GdFeCo as a main constituent and which satisfies $M_{s1} \leq 450$ emu/cc;

providing said recording magnetic layer as a rare earth-transition metal magnetic layer containing TbFeCo as a main constituent, which satisfies $H_{c3} \geq 5$ kOe, and which also satisfies $M_{s3} \leq 200$ emu/cc when said recording magnetic layer is a rare earth-predominant film, wherein it is assumed that said reproducing magnetic layer and said recording hold magnetic layer have saturation magnetization values of $M_{s1}$ and $M_{s3}$, and coercive force values of $H_{c1}$ and $H_{c3}$, respectively;

initializing said reproducing magnetic layer in an external magnetic field in one direction before reproduction;

transferring recorded magnetized information of said recording layer to said reproducing magnetic layer by a magnetic-static field from the recorded magnetized information of said recording magnetic layer under a heated condition at the time of reproduction; and reading the magnetized information transferred onto said reproducing magnetic layer by light-magnetism interaction.

8. A magneto-optical recording medium, comprising:
at least a reproduction layer, a recording layer and an intermediate layer interposed between the recording layer and reproduction layer, and from which recorded signals are read through changing a state of magnetization of the reproduction layer, the reproduction layer and the recording layer having saturation magnetization values of $M_{s1}$ and $M_{s3}$, and coercive force values of $H_{c1}$ and $H_{c3}$, respectively;

the reproduction layer comprises a rare earth-transition metal magnetic layer and satisfies $M_{s1} \leq 450$ emu/cc and $H_{c1} \leq 4$ kOe; and the recording layer comprises a rare earth-transition metal magnetic layer and satisfies $H_{c3} \geq 5$ kOe, and also satisfies $M_{s3} \leq 200$ emu/cc when the recording layer is a rare earth-predominant film.

\* \* \* \* \*